Aug. 4, 1925.
F. H. GLEASON
1,548,033
MEANS FOR LUBRICATING SHACKLE BOLTS OF VEHICLE SPRINGS
Filed Jan. 18, 1921
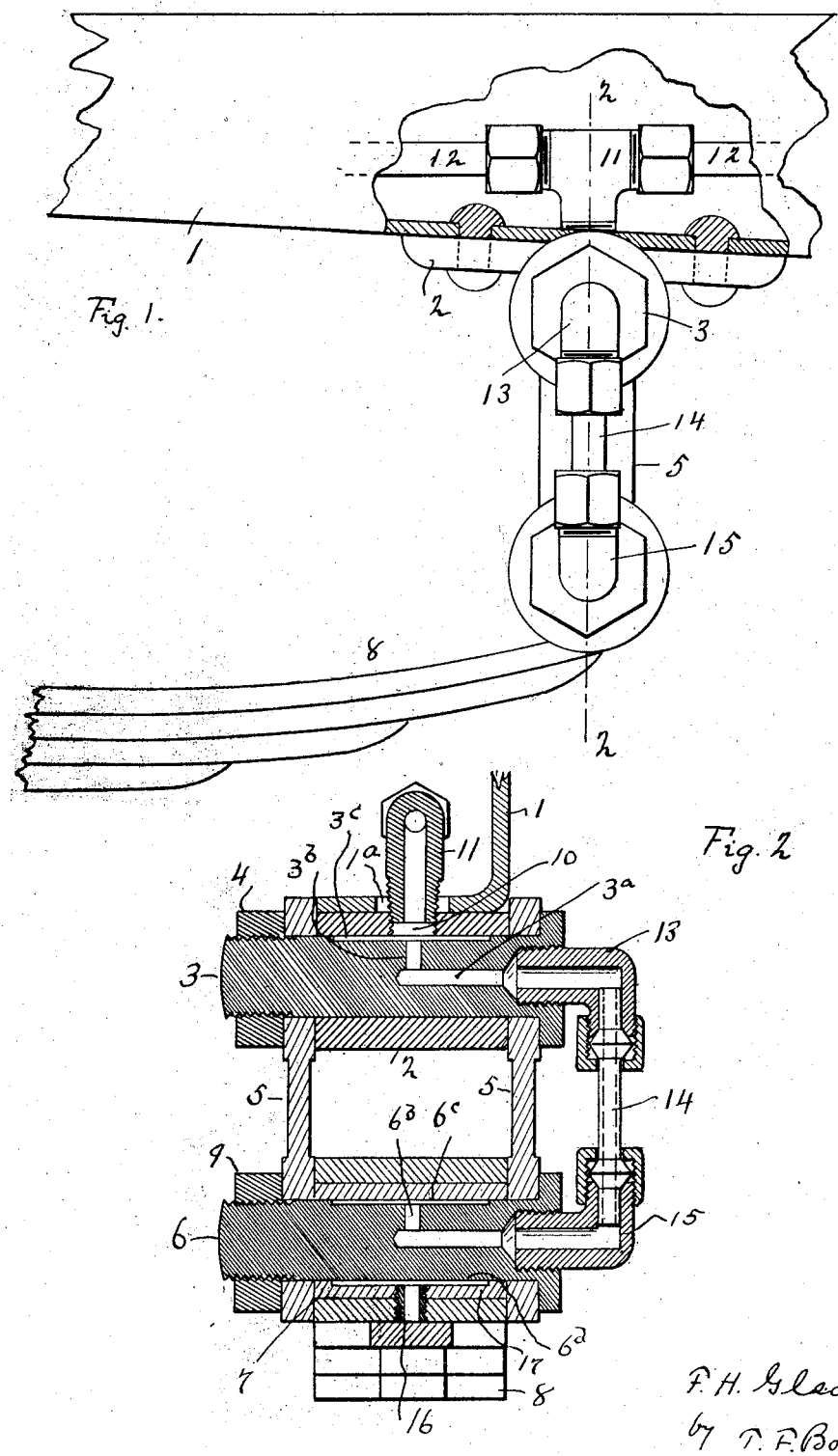

Patented Aug. 4, 1925.

1,548,033

UNITED STATES PATENT OFFICE.

FREDERICK H. GLEASON, OF NEW YORK, N. Y.

MEANS FOR LUBRICATING SHACKLE BOLTS OF VEHICLE SPRINGS.

Application filed January 18, 1921. Serial No. 438,065.

*To all whom it may concern:*

Be it known that I, FREDERICK H. GLEASON, a citizen of the United States, and resident of New York city, borough of Manhattan, in the county of New York and State of New York, have invented certain new and useful Improvements in Means for Lubricating Shackle Bolts of Vehicle Springs, of which the following is a specification.

The object of my invention is to lubricate simultaneously the bearings of the upper and lower bolts of shackles that connect supporting springs to the frames of vehicles, being particularly applicable to spring shackles on automobiles.

In carrying out my invention I provide the bolts that connect the shackles of body springs with bores or chambers to which I connect a conduit, and I provide means to supply the upper bolt with lubricant so that the lubricant will not only lubricate the last named bolt but will flow therefrom to the lower bolt for lubricating the latter and the spring eye connected to said bolt.

My invention further comprises novel details of improvement that will be more fully hereinafter set forth and then pointed out in the claims.

Reference is to be had to the accompanying drawings forming part hereof, wherein Figure 1 is a partly broken side view of a portion of a vehicle embodying my invention, and Fig. 2 is a section on the line 2, 2 in Fig. 1.

The numeral 1 indicates a side bar of the frame of a vehicle, such as a motor vehicle, provided with a bracket or hanger 2 in which a bolt 3 is located in any usual or well known manner. Bolt 3 is shown provided with a head at one end and a nut 4 at the opposite end and pivotally supports the depending shackle members 5. Said members 5 support a bolt 6 that receives the eye 7 at the end of a body spring 8 of the vehicle. Bolt 6 is shown provided with a head at one end and a nut 9 at the other end. The construction so far described is quite usual in motor vehicle construction for movably connecting the frame of the chassis with the supporting spring. Bolt 3 is shown provided with a longitudinal bore or chamber 3ª communicating with a passage 3ᵇ that is opposite a hole 10 in bracket or hanger 2 that is shown threaded and receives a fitting 11 that passes through a hole 1ª in frame 1. Bolt 3 is shown provided with a groove 3ᶜ in its upper surface communicating with hole 10 to distribute lubricant. Fitting 11 is shown in form of a T connected with tubing 12 adapted to receive lubricant from any suitable source, such as from a system receiving lubricant under pressure from the lubricating pump of the engine of the vehicle. A construction for such purpose is set forth in a companion application filed by me. A fitting 13, shown in the form of an elbow, is threaded into one end of bolt 3 and communicates with bore 3ª. A tube 14 is connected with fitting 13 and with a fitting 15 shown threaded into one end of the bolt 6, the fitting 15 being shown in the form of an elbow. Bolt 6 is shown provided with bore or chamber 6ª communicating with fitting 15, said bolt also having a passage 6ᵇ leading through the upper surface to conduct lubricant from passage 6ᵇ to the eye 7 of spring 8. A groove 6ᶜ in the upper surface of bolt 6 communicates with passage 6ᵇ and distributes lubricant to bushing 17. A groove 6ᵈ in the lower surface of the shackle bushing collects oil from the bearing and conducts it through a tube 16 through the shackle bushing 17 to the spring bearing at the eye 7. The fittings —13— and —15— and the tube —14— constitute a continuous conductor with its ends threaded into the respective bolts and form a direct and open communication between the bores 3ª and 6ª.

The construction is such that fittings 13 and 15 with tube 14 are unitarily rigid with bolts 3 and 6 so that the swinging movement of the shackles and of the fittings 13 and 15 and tube 14 are united and synchronous. When the lubricant is supplied to fitting 11 it will lubricate the bearing of bolt 3 in hanger 2 and will pass through bore 3ª to fitting 13 and will flow through conduit or tube 14 and fitting 15 to bore 6ª of bolt 6, whence the lubricant will flow through passage 6ᵇ to the exterior of the bolt for lubricating the eye of the spring. A single source of lubricant supplies both bolts and the bearings associated therewith in every position of the shackles.

Altho I have shown and described a specific construction as illustrative of a perhaps preferred embodiment of my invention, I do not desire to restrict myself to the details of such construction, as for instance, the use of the grooves 3ᶜ and 6ᶜ, as various changes and omissions may be made in the details of construction without departing from the invention as set forth in the appended claims.

Having now described my invention, what I claim is:

1. In an apparatus of the class described, a bearing, a bolt formed with a bore, said bolt mounted in said bearing, a second bolt having a bore, a pair of shackles mounted in spaced relation on said bolts, means for supplying lubricant through said bearing to the bore in the first-named bolt, and a pipe having one end connected to an end of the first-named bolt and in communication with its bore, and having its other end connected to an end of the second-named bolt, and in communication with its bore.

2. In an apparatus of the class described, a bearing, a bolt formed with a bore opening at one end of the bolt, said bolt mounted in said bearing, a second bolt having a bore opening at one end of the bolt, a pair of shackles mounted in spaced relation on said bolts, means for supplying lubricant through said bearing to the bore in the first-named bolt, and a pipe having one end connected to the open end of the first-named bolt, and adapted to receive lubricant from the bore thereof, and having its other end connected to the open end of the second-named bolt and adapted to supply lubricant to its bore.

3. In an apparatus of the class described, a bearing, a bolt formed with a bore opening at one end of the bolt, said bolt mounted in said bearing, a second bolt having a bore opening at one end of the bolt, a pair of shackles mounted in spaced relation on said bolts, means for supplying lubricant through said bearing to the bore in the first-named bolt, a substantially U-shaped pipe, a fitting connecting one end of said pipe to the open end of one of said bolts and a second fitting connecting the other end of said pipe to the open end of the other bolt.

4. In an apparatus of the class described, a bearing having a passageway through the wall thereof, a bolt formed with a longitudinal bore and a radial conduit leading from the surface of the bolt to said bore, and in communication with said passageway, said bolt mounted in said bearing, a second bolt having a longitudinal bore, a pair of shackles mounted in spaced relation on said bolts, means for supplying lubricant through said passageway and said conduit to the bore in the first named bolt, and a substantially U-shaped pipe having one of its ends connected to an end of the first-named bolt and in communication with its bore, and having its other end connected to an end of the second-named bolt and in communication with its bore.

5. In an apparatus of the class described, a pair of shackles, a pair of bolts extending through said shackles and projecting at one end outwardly from the shackles, and each bolt being provided with a longitudinal bore opening at the end of the bolt projecting outwardly from the shackle, a bearing for one of said bolts, means for supplying lubricant through said bearing to the bore of the bolt mounted therein, and lubricant-conveying means outside the shackle connecting the projecting ends of the bolts.

6. In a lubricating system, a shackle connection including an upper shackle bolt, and a lower shackle bolt, each of said shackle bolts having an axial and a radial bore communicating with each other and a longitudinal groove in its periphery communicating with the radial bore, means for supplying lubricant to the peripheral groove of the upper shackle bolt in such a manner that a portion of the lubricant is utilized to lubricate the upper shackle bolt and another portion of the lubricant is conveyed to the axial and radial bores of the upper shackle bolt, and a pipe having threaded connection with the ends of the shackle bolts and having direct, free and open communication with the axial bores of said shackle bolt for conveying the lubricant from the axial bore of the upper shackle bolt directly to the axial bore of the lower shackle bolt.

7. In a lubricating system, a shackle connection including an upper shackle bolt, a lower shackle bolt and links connecting said shackle bolts, each of said shackle bolts having an axial bore and a radial bore communicating with each other and a peripheral groove communicating with the radial bore, and means for supplying lubricant to said shackle bolts including a sleeve arranged on said upper shackle bolt, a lubricant supply pipe having a branch connected to and extending through said sleeve and communicating with the peripheral groove of said upper shackle bolt whereby lubricant is supplied to the upper shackle bolt and to the bores thereof, and a pipe having direct threaded connection with the ends of the upper and lower shackle bolts and affording free, open and direct connection between the axial bores thereof whereby the lubricant is conveyed from the upper shackle bolt to the lower shackle bolt.

8. In a lubricating system, a shackle connection including an upper shackle bolt and a lower shackle bolt, each of said shackle bolts having an axial and a radial bore communicating with each other, means for supplying lubricant to the radial bore of the upper bolt in such a manner that a portion of the lubricant is utilized to lubricate the upper shackle bolt and another portion of the lubricant is conveyed to the axial bore of the upper shackle bolt, and a pipe having threaded connection with the ends of the shackle bolts, and having direct, free and open communication with the axial bores of said shackle bolts for conveying the lubricant from the axial bore of the upper shackle bolt directly to the axial bore of the lower shackle bolt.

9. In a lubricating system, a shackle connection including an upper shackle bolt, a lower shackle bolt and links connecting said shackle bolts, each of said shackle bolts having an axial bore and a radial bore communicating with each other, means for supplying lubricant to the shackle bolts including a sleeve arranged on said upper shackle bolt, a lubricant supply pipe having a branch connected to said sleeve, and in communication with the radial bore of said upper shackle bolt, and forming a means adapted to supply lubricant to the upper shackle bolt and to the bores thereof, and a pipe having direct connection with the ends of the upper and lower shackle bolts, and affording direct connection between the axial bores of said bolts whereby the lubricant is conveyed from the upper shackle bolt to the lower shackle bolt.

10. In a lubricating system, in combination with a chassis including an angle frame member and a spring, a shackle connection including an upper shackle bolt mounted on the angle frame member, a lower shackle bolt engaged with the spring, shackles having pivotal connection with said shackle bolts, each of said shackle bolts having an axial bore and a radial bore communicating therewith, means for supplying lubricant to said shackle bolts including a sleeve arranged on the upper shackle bolt, a lubricant supply pipe disposed in the angle frame member of the chassis and having a branch connected to said sleeve, and communicating with the radial groove of said upper shackle bolt, whereby said upper shackle bolt and its bore are supplied with lubricant and a pipe having threaded connections at its ends with the shackle bolts, and directly communicating with the axial bores thereof so as to afford direct communication between the axial bores of the upper and lower shackle bolts whereby lubricant is supplied to the lower shackle bolt from said upper shackle bolt.

Signed at New York city, in the county of New York, and State of New York, this 14th day of January, A. D. 1921.

FREDERICK H. GLEASON.